(12) United States Patent
Cultrara (10) Patent No.: US 7,249,568 B1
(45) Date of Patent: Jul. 31, 2007

(54) BOAT CAMPER

(76) Inventor: William J. Cultrara, 1937 Strong Rd., Victor, NY (US) 14564

( * ) Notice: Subject to any disclaimer, the term of this patent is extended or adjusted under 35 U.S.C. 154(b) by 22 days.

(21) Appl. No.: 10/764,830

(22) Filed: Jan. 26, 2004

Related U.S. Application Data (60) Provisional application No. 60/442,217, filed on Jan. 24, 2003.

(51) Int. Cl.
*B63B 17/00* (2006.01)

(52) U.S. Cl. .................................... 114/361; 114/61.1

(58) Field of Classification Search ............ 114/61.1, 114/71, 78, 343, 349, 361, 363, 364; 135/88.01, 135/90, 96, 133
See application file for complete search history.

(56) References Cited

U.S. PATENT DOCUMENTS

| | | | |
|---|---|---|---|
| 2,794,192 A * | 6/1957 | Paris .................... | 114/61.11 |
| 2,992,444 A | 7/1961 | Schuler | |
| 3,435,470 A | 4/1969 | Krenzler | |
| 3,662,412 A | 5/1972 | Hawkins | |
| 3,673,622 A | 7/1972 | Allen | |
| 3,726,245 A | 4/1973 | Critcher | |
| 3,760,764 A | 9/1973 | Jones et al. | |
| 3,800,726 A | 4/1974 | Murphy | |
| 3,831,208 A | 8/1974 | Smith | |
| 4,024,592 A | 5/1977 | Schlagenhauf | |
| 4,165,117 A | 8/1979 | Kaiser | |
| 4,562,786 A * | 1/1986 | Pruonto .................... | 114/361 |
| 4,883,016 A * | 11/1989 | Larson .................... | 114/363 |
| 4,926,782 A * | 5/1990 | Lacy .................... | 114/361 |
| 4,981,100 A | 1/1991 | Bergeron | |
| 5,044,298 A * | 9/1991 | Pepper et al. ............. | 114/361 |
| 5,133,276 A | 7/1992 | Alesi, Jr. et al. | |
| 5,374,206 A | 12/1994 | Gregory | |
| 5,570,649 A | 11/1996 | Austin | |
| 5,706,752 A * | 1/1998 | Menne et al. ............. | 114/361 |
| 6,006,692 A * | 12/1999 | Szukhent, Jr. ............. | 114/361 |
| 6,260,505 B1 * | 7/2001 | Polidan .................... | 114/361 |

(Continued)

FOREIGN PATENT DOCUMENTS

DE         3517722 A1     10/1985

OTHER PUBLICATIONS

Internet website printout: www.nomadhouseboats.com, 2 pages featuring "Voyager 25".

(Continued)

*Primary Examiner*—Lars A. Olson
(74) *Attorney, Agent, or Firm*—Thomas R. FitzGerald, Esq.; Hiscock & Barclay, LLP (57) ABSTRACT

A boat camper vessel 10 has a pair of pontoons 12, 13 joined by a bridge 44 that provides the deck of the vessel. A main canopy 22 stores in the bow when not is use. The raised canopy 22 is supported by ribs 220 and it extends from the bow 30 to a stern bulkhead 20 or 21. Two stern bulkheads 20, 21 define a stern compartment 60 has holds a toilet 29, shower 34 and water heater 35. An auxiliary canopy 36 covers the stern compartment 60. Marine electric motors in the pontoons drive propellers to propel the vessel. The vessel is suitable for travel on canals, small lakes and other protected bodies or water. It may be docked or placed on land and will serve as a camper whether on water or land.

24 Claims, 8 Drawing Sheets

U.S. PATENT DOCUMENTS

| | | | |
|---|---|---|---|
| 6,263,825 B1 * | 7/2001 | Davidson | 114/343 |
| 6,322,406 B1 | 11/2001 | Griffith, Sr. et al. | |
| 6,361,385 B1 | 3/2002 | Bland et al. | |
| 6,623,322 B1 * | 9/2003 | Lesniak | 441/38 |
| 2002/0134295 A1 | 9/2002 | Chimato | |

OTHER PUBLICATIONS

Internet website printout: www.catamaranhouseboats.com/vagabond/bagabond.htm, 3 pages featuring Vagabonds, specifications for same.

Internet website printout: www.rotationallymoldedplastics.com, 1 page of printout identifying companies specializing in plastics and custom molded plastics.

Internet website printout: www.etanks.com/productselectpage.html, 1 page featuringproduct list from etanks.com.

Internet website printout: www.rotationallymoldedplastics.com, 1 page identifying names of companies specializing in plastics and custom molded plastics.

Advertisement page for Ray Electric Outboards, Inc., 6 pages of ads featuring photographs, specifications, and various information for Ray brand boats.

* cited by examiner

BOAT CAMPER

PRIOR APPLICATIONS

This application claims the benefit of the filing date of U.S. Ser. No. 60/442,217 filed Jan. 24, 2003, whose entire contents is hereby incorporated by reference.

FIELD OF THE INVENTION

The present invention relates to recreational vehicles and, more particularly, a vehicle that serve both as camper and a boat.

BACKGROUND OF THE INVENTION

The last fifty years have been marked by tremendous advances in recreational craft that enable a growing number of people to enjoy the outdoors with many of the pleasures and accommodations of home. In particular, advances in recreational vehicles of both the land and water types have resulted in more affordable and efficient crafts. Many of these craft are quite comfortable with enjoyable and very functional arrangements for cooking, bathing, sleeping and entertaining.

There continues to be demand for improvements in vehicles which can be used as a fishing boat or excursion boat and provide some accommodations similar to a camper or a houseboat. Such multi-functional products can satisfy needs of the many recreational enthusiasts who desire to have available on an outing a watercraft that offers comfort, convenience and functionality. On the other hand, when functions of two or more products are combined to provide one product, with intent to serve both purposes, compromises are sometimes necessary. It is not unusual for the resulting product to have limitations not present in one of the two independent products. In the past, numerous solutions have been proposed to meet the demand for an overnight watercraft. However, such products have limited the quality of some features or the functional performance of other features to what some users may consider unsatisfactory.

For example, in order to comply with common over-the-road trailering requirements (in the absence of special permitting) the width of such units is limited to 8 feet and six inches. To accommodate the functional conveniences needed for living in the unit the length will commonly exceed 25 feet. A disadvantage resulting from the minimal width, or from the proportion of width to length, is instability when the unit functions as a water vessel. Indeed, efforts have been made to assure greater stability when these multi-functional units are placed on water in order to reduce the risk of capsizing, and some solutions to address this problem have been commercialized. See, for example, U.S. Pat. No. 6,029,598 incorporated herein by reference, which discloses a trailerable houseboat/camper unit having pontoons which may be moved to the top (i.e., the roof) of the unit during trailering in order to reduce the vehicle width.

By way of further example, it is well known that trailerable house boats and campers may become unstable at high roadway speeds due to wind loading. High profiles may detract from fuel economy, but to some extent energy inefficiency is accepted as a trade-off in order to avoid costly, time consuming or complex mechanical arrangements. To a limited extent these problems have been addressed with collapsible/expandable interconnecting walls, analogous to those provided in a pop-up style camper. See, for example, U.S. Patent Application Pub. No.: US 2002/0134295 A1 incorporated herein by reference.

In addition, to meet price points in those markets in which such products are offered, a balance is struck between the variables of efficiency or economy and the variables of comfort or convenience. While it is often technically possible to provide attractive appointments and optimal features, it is a desire in the art to make such available at more affordable prices. It is also desirable to provide such features with simplicity and without adding inconvenience to the user.

There is now provided an improved boat camper. According to exemplary embodiments of the invention, the unit can be efficiently placed on a trailer for towing by a vehicle. The boat camper serves as a camper while on the ground or when placed on water. Thus, the unit provides features found in a dedicated houseboat of comparable size.

SUMMARY

The invention is a trailerable recreational vessel that may serve as a camper on land or water. It has a hull that includes a pair of spaced-apart pontoons and a bridge connecting the pontoons together and forming a deck for passengers. The vessel has a curved bow with a forward storage area for receiving a main canopy. The vessel has deck that extends from the bow to the stern. The main portion of the deck between the bow and stern includes a forward area for the pilot and passenger that may be converted into one or more seating or sleeping configurations. Next is a galley and storage area that has storage lockers, a lavatory, and combination stove and refrigerator. A stern compartment is defined by a pair of spaced apart bulkheads with openings and doors. An auxiliary canopy covers the stern compartment. The stern compartment houses a toilet, shower and hot water heater. The stern deck holds utility tanks with water, pressurized air and propane.

BRIEF DESCRIPTION OF THE DRAWINGS

The various features and objects of the invention and the methods of attaining such will be best understood the following detailed description is read in conjunction with the accompanying drawings wherein.

DETAILED DESCRIPTION OF THE INVENTION

A boat camper 10 having the features of the invention will first be described with reference to FIGS. 1-6. The boat camper 10 has a catamaran-type hull with port and starboard pontoons 12, 13 connected together by a bridge 44. The pontoons 12, 13 and bridge 44 are made of any suitable marine material. They may be fiberglass, plastic, resin, composite, or suitable marine material. Rubber foot supports 14.1-14.6 on each pontoon provide a user with a slip resistant foot hold. The bow 30 of the vessel has a raised portion 31 that curves around the forward part of the vessel to provide a break against bow waves. Each pontoon has a fin 45, 49 and the bridge 44 has three fins 46, 47, 48 to help break the water as the vessel moves forward. A pair of rails 4, 5 on the port side and a corresponding pair of rails on the starboard side provide hand grips for passengers and also storage racks for extra equipment and bicycles or other recreational equipment. The rails curve around the storage tanks 15-18 on the stern.

Behind the bow 30 is a main area that includes a combined seating and sleeping area near the bow and a galley and utility area. The seating area is defined by a set of cushions 52 that are arranged in a seating pattern. Proceeding toward the stern, there is a deck 40 that is part of the bridge 44. On the deck there are seats 23.7, 23.2 for a pilot 9 and a passenger. Behind the seats are spaces for port and starboard storage lockers 25, 26, a combination propane powered stove and refrigerator 27 and a lavatory 28. A stern compartment 60 is formed by fore and aft bulkheads 20, 21. The bulkheads have openings 42, 43, respectively. The openings may be closed by hinged panels that provide doors. The doors, not shown in FIGS. 1-6, are discussed later. The stern compartment 60 encloses a toilet 29, a hand shower space 34 and storage compartment for a propane or electric hot water heater 35.

The rear of the deck 40 provides further storage for a pair of fresh water tanks 15, 16, a tank of compressed air 17 and a tank for propane gas 18. The compressed air supplies air pressure to the water tanks 15, 16 and the water tanks provide water to the hot water heater 35, the lavatory 28, the toilet 29 and the shower 34. The propane tank supplies propane gas to the galley including the combined stove and combined refrigerator/stove 27.

Figure 9:
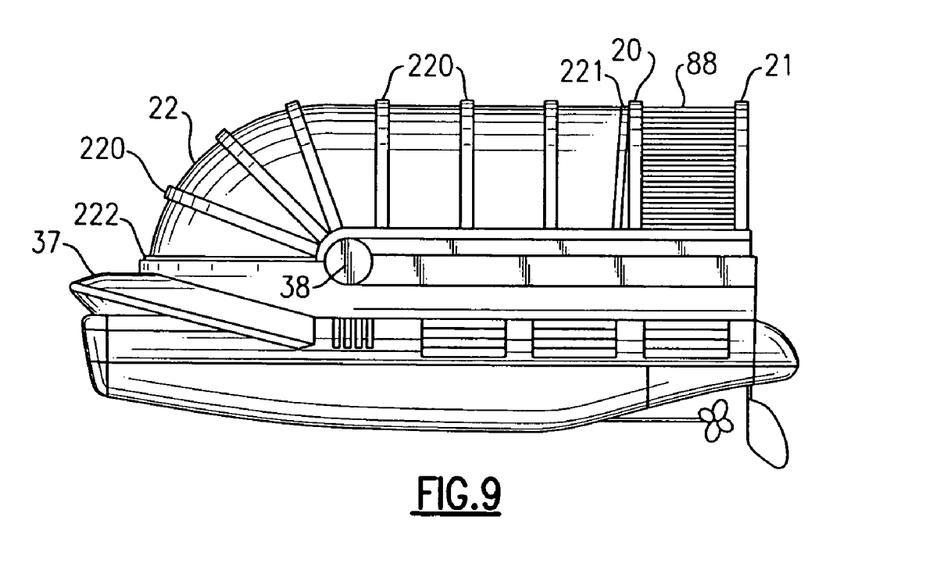
FIG. 9 is a side elevation view of the boat camper with a raised canopy.
Figure 11A:
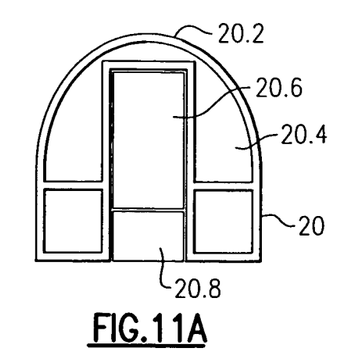
FIGS. 11a. 11b and 11c show successive view of the bulkhead with a door or deck insert.
Figure 11B:
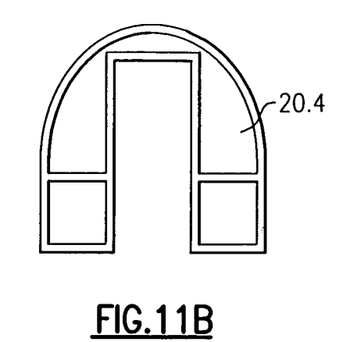
Figure 11C:
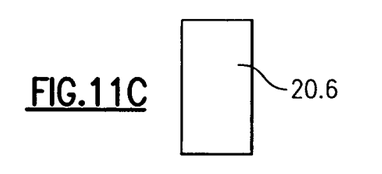
Figure 11D:
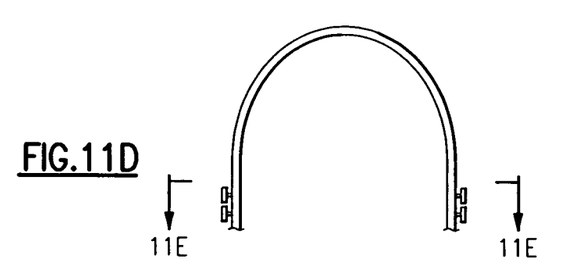
FIG. 11d is an elevation view of a support rib.
Figure 11E:
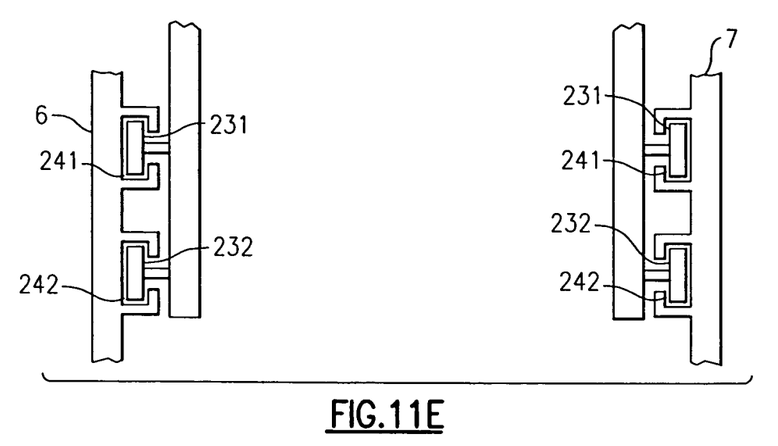
FIG. 11e is a magnified view of the a potion of FIG. 11d taken across the line E, E' of FIG. 11e.

With reference to FIG. 9, the boat camper may be secured from rain and wind by two collapsible and waterproof canopies. Auxiliary canopy 36 is located between the between the bulkheads 42, 43. Main canopy 22 folds into a bow storage compartment disposed beneath the removable cushions 52. The main canopy 22 is operated by crank 19. See FIG. 14a. Bulkhead rib 221 is connected via a suitable chain and gear train to the crank 19. Assist springs 38, 39 are housed on opposite sides of the vessel. The bow rib 222 is connected to the assist springs. The assist springs are compressed when the main canopy is stored. When the crank 19 is operated, the assist springs 38, 39 unwind and help raise the main canopy. As the canopy is cranked toward the stern, the assist springs come under tension and help keep the canopy taught. The crank 19 operates a gear train (not shown) and pulls the ribs and the canopy from their stored position in the bow and causes the canopy to rise up and travel toward the rear of the vessel. The canopy and its support ribs 220 are raised or lowered to enclose or open the main cabin area between the bow and the stern compartment. The ribs 220 have vertical sides and are curved between the sides with a radius of curvature corresponding to the curvature of the bow to permit collapse of the canopy and storage of the canopy and its ribs in the bow. As shown in FIGS. 11d and 11e, the support ribs 220 have pairs of guide buttons 231, 232 at the base of each rib. The guide buttons are retained in guide tracks 241, 242 that are formed in the port and starboard bulkheads 1,2.

The canopies 22, 36 are made of water and/or wind resistant material, such as GORE-TEX® Fabric, a registered trademark of W. L. Gore & Associates, Inc. It is also optional to make all or part of the canopies out of transparent or translucent material. The canopies may have one or more windows. Such windows may be strategically placed in the canopies to permit the pilot to see out from the raised canopy so that the pilot can steer in foul weather. For example, the curved front portion of the main canopy could be transparent. The doors in the bulkheads may also have windows to permit the pilot to see the view behind the vessel.

Alternate fabrics and materials may be used for the canopies. For example, the main canopy can be a partially reflective or photoactive so that it darkens as light increases to provide privacy during daylight hours and reduce sun glare. The auxiliary canopy 36 may be made of other material that performs two functions. For example, the material may be solar panels for absorbing solar energy and recharging the batteries. In this way the vessel may have an extended cruising time and require less frequent return trips to a charging station.

Figure 7:
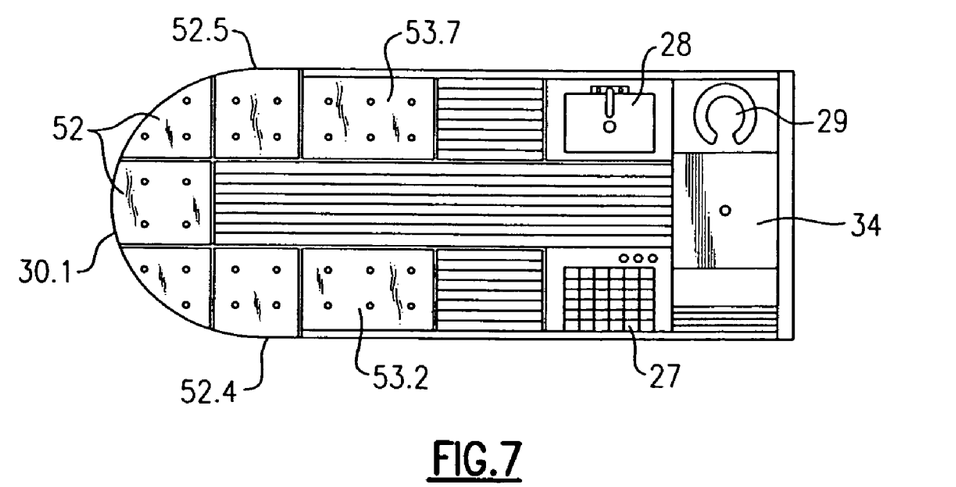
FIG. 7 is a plan view of the deck of the boat camper with a seating arrangement of seat cushions.
Figure 8:
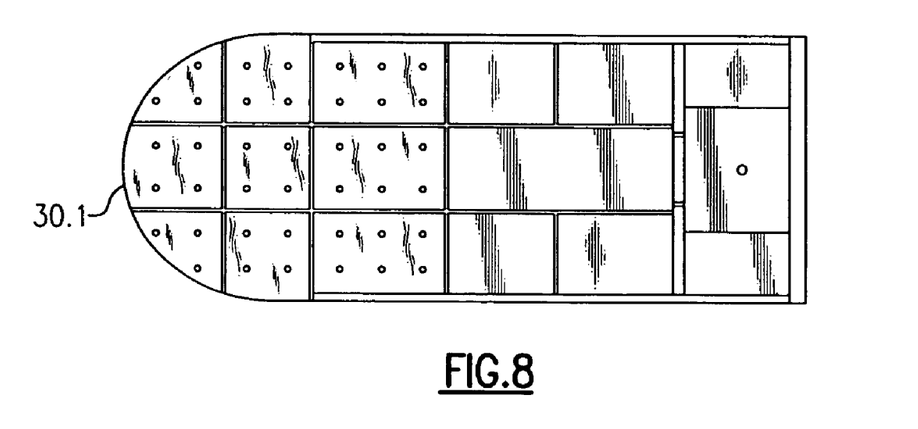
FIG. 8 is plan view of the deck of the boat camper with a sleeping arrangement of seat cushions.

Turning to FIGS. 7 and 8 there are shown alternate seating and sleeping arrangements for the cushions. During operation of the vessel, the cushions are arranged as shown in FIG. 7 to provide a forward seating area in the bow 30, a forward facing seat 53.7 for the pilot and a side facing seat 53.2 for a passenger. A sleeping arrangement is shown in FIG. 8. A set of slats (not shown) similar to the slats on a roll top desk are stored beneath the center bow cushion. The slats are pulled out and are supported on opposite ends by the structures (not shown) that support the port and starboard cushions 52.4 and 52.5. Once the slats are in place they bridge the open deck space between the center bow cushion and the rear of the pilot and passenger seats. By comparing one figure to the other, one can see that a portion of the deck between the pilot seat and the passenger seat is covered with cushions to provide a sleeping area for the occupants.

One of the features of the vessel is that the tops 20.2, 21.2 of the bulkheads 20, 21 have a similar radius of curvature as the curvature 30.1 of the inside of the bow 30. As such, the bulkheads 20, 21 may be stored in the bow of the vessel. The bulkheads 20, 21 and the doors are made of rigid material, preferably an engineering plastic or resin. Other materials are useable, including and not limited to wood, steel and aluminum. The doors to the bulkheads may be placed on the deck or over the cushions to provide an elevated platform for the passenger. Such elevated platforms are especially desired for fishing. The bulkheads 20, 21 are identical. With reference to FIGS. 11a-11c, the bulkhead 20 has a top curved edge 20.2 and vertical sides. It includes a main panel 20.4 and the upper part 20.6 of a two-part (Dutch) door. The lower part 20.8 of the door remains in place to divide the stern compartment from the main cabin or may be stored on the outside of the storage compartments. Clips or catches are used to hold the lower door parts in place on the outside of the storage compartment. The storage compartments open from the top, so the side stored lower door portions do not interfere with use of the storage compartments.

Figure 1:
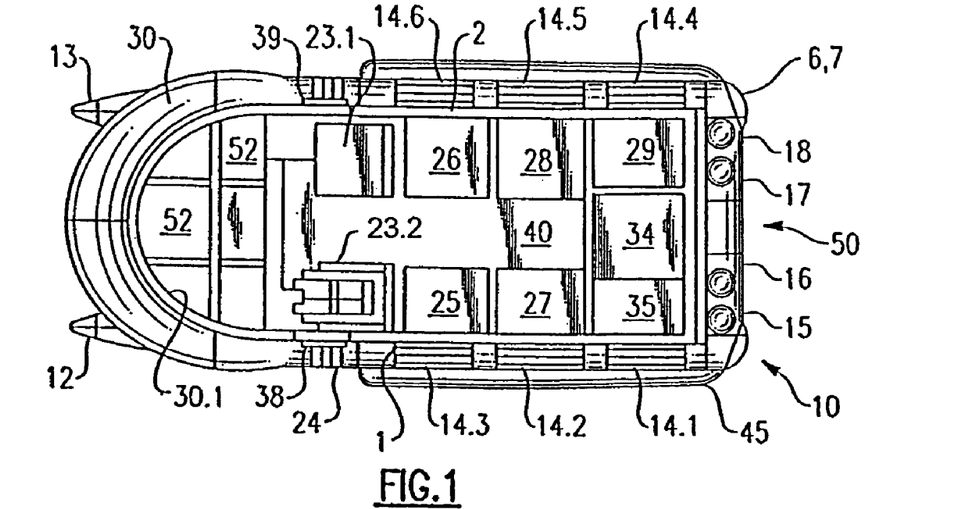
FIG. 1 provides a front elevation view of a boat camper according to the invention.
Figure 2:
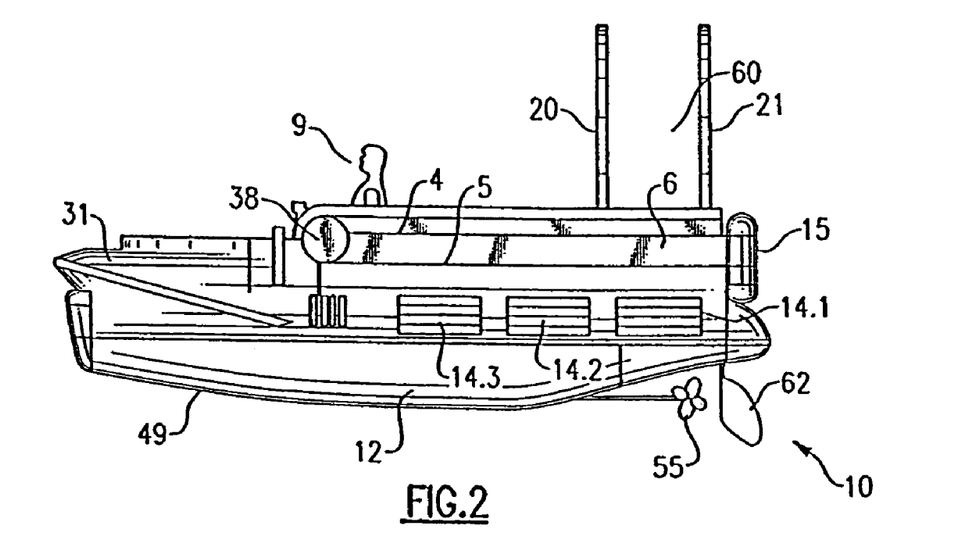
FIG. 2 provides plan view of the boat camper of FIG. 1.
Figure 3:
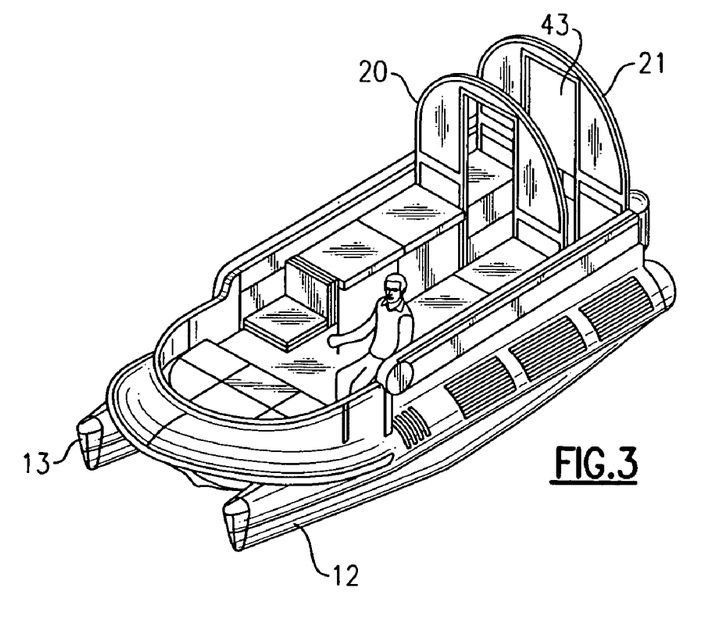
FIG. 3 provides a front perspective view of the FIG. 1 boat camper.
Figure 4:
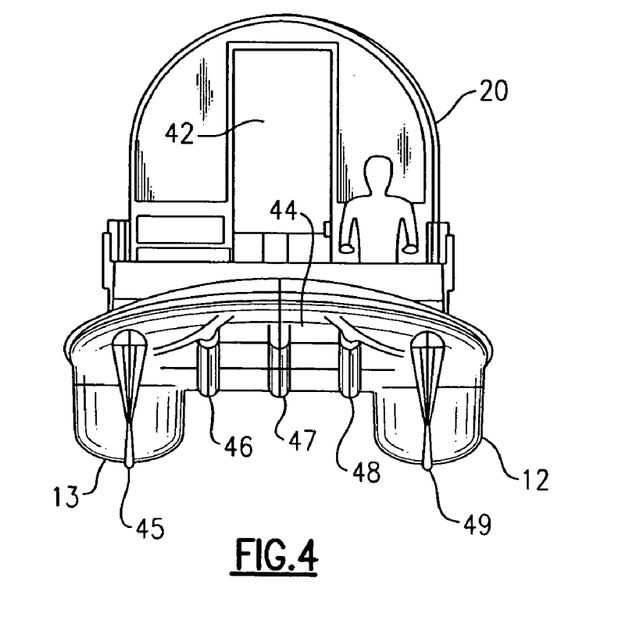
FIG. 4 is front elevation view of the taken FIG. 1 boat camper.
Figure 5:
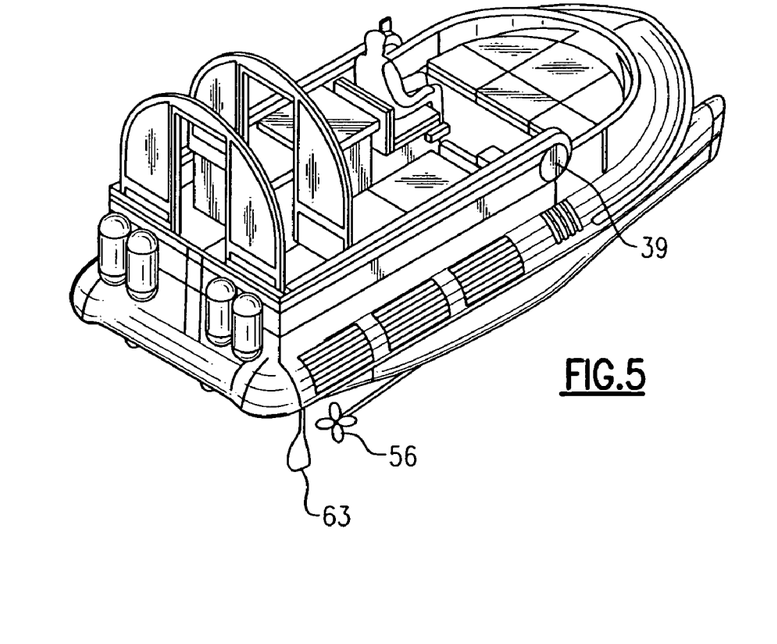
FIG. 5 is rear perspective view of the FIG. 1 boat camper.
Figure 6:
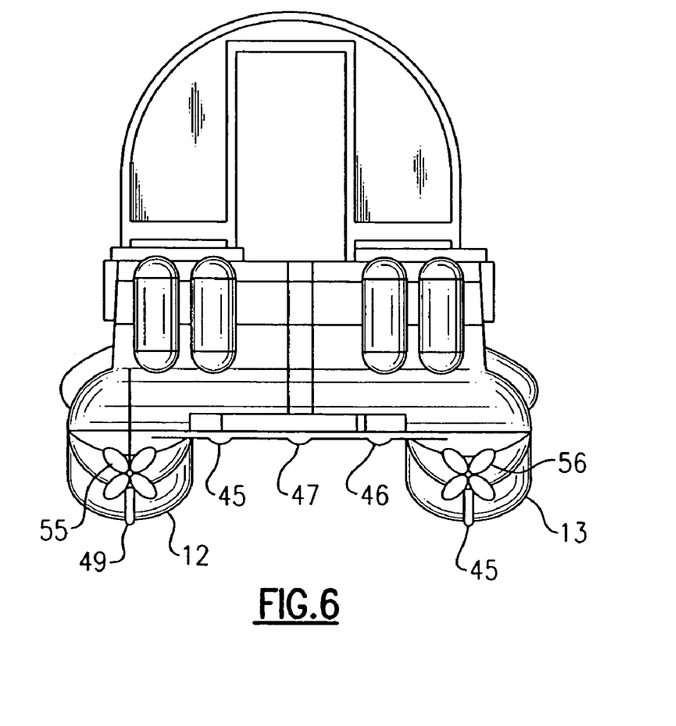
FIG. 6 is a rear elevation view of the boat camper of FIG. 1.
Figure 14A:
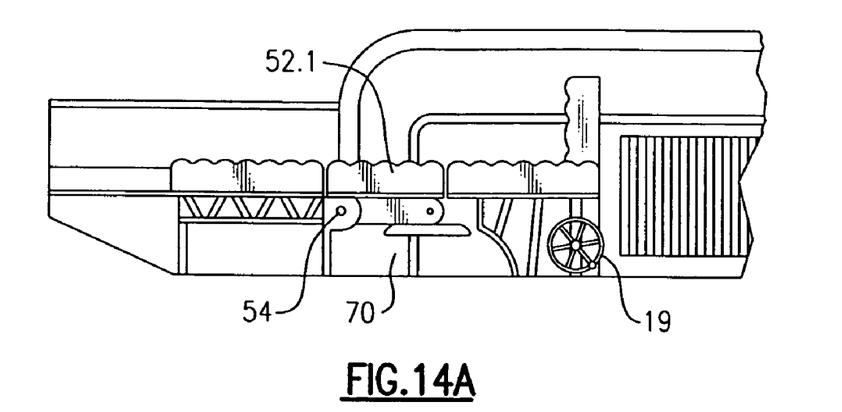
FIGS. 14a, 14b show the helm in its stored and active positions.
Figure 14B:
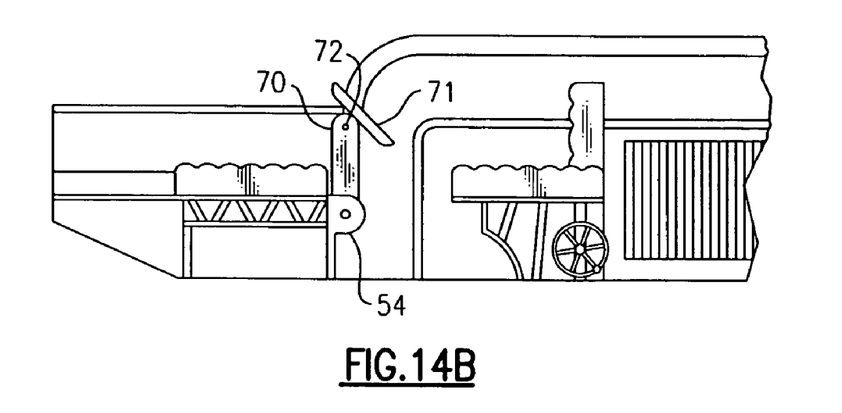

As shown in FIGS. 1 and 2, the pilot may be in the front port seat 53.2. In FIG. 7 the vessel is modified to have the pilot in a starboard seat 53.7. In both embodiments, the helm 70 is raised to face the pilot. With reference to FIG. 14*a*, the helm 70 is stored, faces the deck, and is covered by a seat or sleeping cushion 52.1. To operate the helm 70, cushion 52.1 is removed and the helm 70 is rotated about a base swivel 54 to a raised position as shown in FIG. 14*b*. The control panel 71 on the helm 70 is oriented and locked into its operating position on panel swivel 72. The control panel 71 is shown only in schematic form. It may include conventional gauges and instruments to show the speed, heading, depth, and battery charge and may have one or more electrical switches to turn on running lights or operate other lights and electrical equipment. The control panel 71 will included a joystick control for operating the rudders and one or more speed control levers for setting the speed of the marine electric motors.

Figure 12:
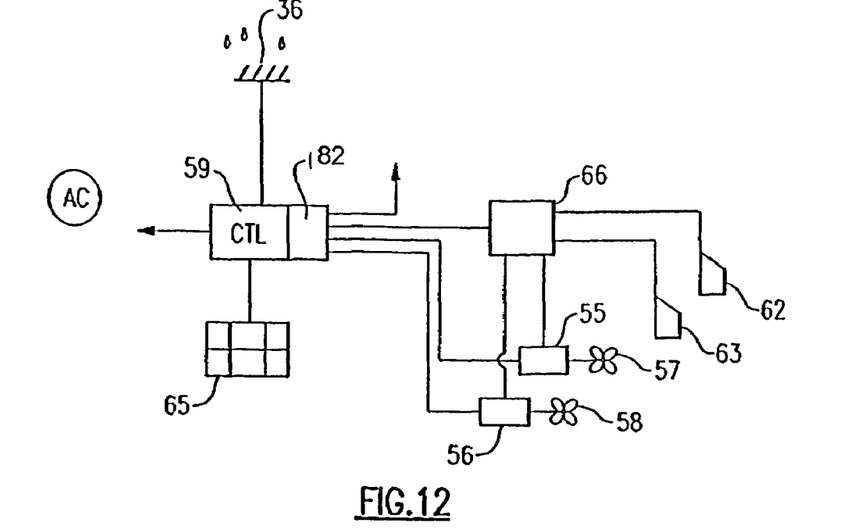
FIG. 12 is a schematic of the propulsion, steering and energy supply for the vessel.

With reference to FIG. 12, there is a shown a combined schematic for the electrical system that supplies energy to the vessel and the propulsion and steering systems. A controller 59 connects to a source of electrical energy, such as a land-based alternating current supply or to a solar power cell carried on the auxiliary canopy 36. The controller 59 converts the alternating current and solar cell current into a suitable level of direct current for charging a bank of batteries 65. The vessel has deep charge marine batteries. Each pontoon holds three batteries in waterproof compartments. In the preferred embodiment the battery compartments are located below the rubber foot supports 14.1-14.6. The supports also provide watertight seals for the battery compartments and allow easy access to the batteries from the outside of the vessel. Any suitable sealing arrangement is acceptable as long as it prevents water from leaking into the battery compartments.

A DC/DC converter 67 alters the dc output of the battery pack 65 to provide the appropriate dc level to power the lights and other electrical systems on the vessel. The vessel is driven by dual electric marine dc motors 55, 56 that are between two and twelve horsepower. Each pontoon carries one of the motors. The outputs of the motors are connected, respectively, to propellers 57, 58. Port and starboard rudders 62, 63 steer the craft. The rudders are operated by servo motors (not shown) in a manner well known in the art to direct the thrust of the motors. The positions of the rudders are controlled by a joystick 66 that is operated by the pilot 9 from the helm 70. Those skilled in the art understand that the vessel 10 may have alternate arrangements and components for providing power and steering.

In order to understand the propulsion system of the vessel 10, consider the directional control of a boat. A boat's keel, running the length of the craft, slips more easily along its longitudinal axis than it does along its lateral axis or beam. As the boat moves through the water, hydrodynamic forces (i.e., the inertial reaction force of the water) act equally on both sides of the keel, forcing it to move straight ahead. Vectoring the thrust of a powerboat to one side (e.g., to port) pushes the stern of the keel to the other side (e.g., starboard). This causes an increase in hydrodynamic force on the opposite side (e.g., starboard) that pushes the bow of the boat back in the direction of the original thrust vector (e.g., port).

In a boat with shallow draft and rounded pontoons, the keel effect is small as there is no well-defined side of the keel to push against the water. Vectoring the thrust on this type of hull causes the boat to rotate on its axis (yaw) but its tendency to turn is low since the hydrodynamic forces are small. The relatively low thrust of an electric motor further complicates matters since even its tendency to rotate is small. A small wind acting on the large side surface area of a tented camper can easily create a force many times larger than the hydrodynamic force acting on the round pontoons. The result is that the boat will turn away from the wind and the pilot will not be able steer back into the wind and will therefore lose control of the craft.

The boat camper 10 is intended to be a two-person watercraft for use as a conventional pop-up tent camper on land and in the water. It is intended for use on-protected waters as small mountain lakes and canals. Due to its size, the boat camper is also likely to be used on semi-protected waters like rivers and large lakes. As such, it should have sea-keeping abilities to handle a bit rougher weather. Our rough weather design goal is to make headway into a 15-knot headwind and 1-2 foot seas.

The boat camper 10 will be powered by clean quiet electric motors. Six deep charge marine batteries 65 provide cruising power for a day on the water. On board battery charger 82 recharges the batteries using solar power during the day or shore power at night leaving the craft ready for another day on the water by morning. It has a catamaran hull for efficiency, stability, and handling and sea-keeping ability. The twin hulls of a catamaran provide a wide platform for the camper components without the normal rough ride of a beamy short boat.

The vessel 10 is powered by twin-screws 57, 58 and may have separate throttle levers for each motor 55, 56 and a wheel to control the rudders 62, 63. The throttle levers also control the direction of the motors simply by moving them fore and aft from the neutral position. This is an acceptable control solution and would be familiar to anyone who has driven a boat before. It is also possible to use a joystick control that could operate servo-drives on the rudders as well as the propulsion motors to provide a unique control system.

The vessel has complete control without bow or stern thrusters. When a propeller rotates in the water, it pushes water along the axis of the propeller shaft. The motion of the water is not linear however. Since the propeller is rotating, it actually twists the water as it accelerates it. As this water column rotates, it also expands as the molecules in motion contact adjacent molecules, creating an expanding cone. The water in the cone nearest the bottom of a hull is slowed or gets deflected or sheared from the column of working water. The water farthest from the hull does not experience the attenuating effect and provides a greater reaction force perpendicular to the axis of the shaft. What all this means is that the rotating propeller tries to push the stern of the boat to one side. When the boat is operating in forward, this effect is easily overcome by the flow of water over the rudder, which steers the boat.

When operating in reverse and at slow speeds, there is not enough flow over the rudder to overcome the uneven forces on the propeller blades. This is sometimes known as the paddlewheel effect. After the boat generates enough sternway to provide sufficient flow over the rudder, this effect can be overcome. This is why the stern of a single engine boat with a right hand propeller (clockwise when viewed from behind) tends to slide to the left when the boat is reversed.

This paddlewheel effect can be used to improve the low speed handling of a boat. Consider the problem of docking a boat beam to a pier between two other boats. The vessel may be moved sideways to dock and undock. If the boat has a left hand propeller on the starboard side and a right hand propeller on the port side, reversing the starboard motor will produce a thrust vector forward and to port. The reaction on the boat moves its stern aft and to starboard. By driving the port motor forward just enough to cancel the reverse thrust of the starboard motor, the resulting reaction on the boat causes it to slide directly sideways toward the pier. The joystick control has a computer (not shown) to decipher the pilot's motions on the joystick and convert them to control commands to the propulsion motors and rudder actuators. The pilot is then free from thinking about the physics of the process and only has to manipulate a familiar control.

The control system has multiple modes. The docking mode is described above. A cruising mode allows the throttles to be set at a constant speed and the joystick or a separate wheel used to control the rudders. Then the pilot does not have to maintain a constant force on the joystick in the forward direction while cruising for extended periods.

Figure 10:
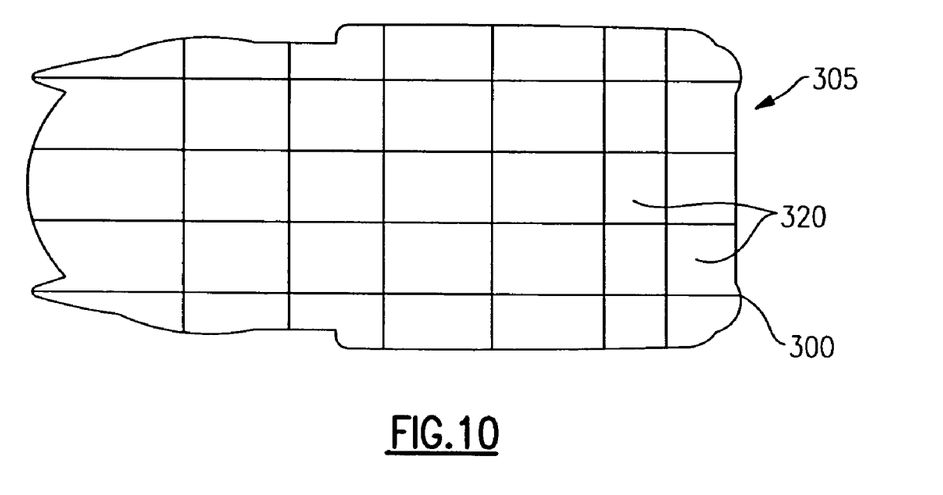
FIG. 10 is a plan view of the hull.
Figure 13A:
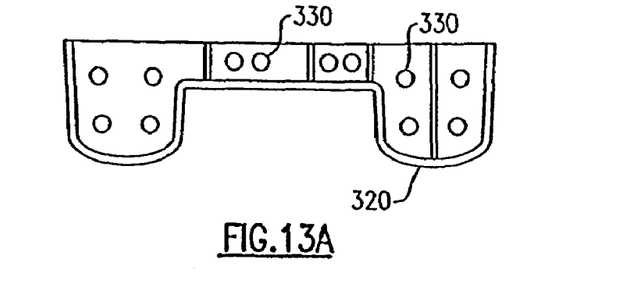
FIGS. 13a, 13b show the trusses and bulkheads in the pontoons and bridge.
Figure 13B:
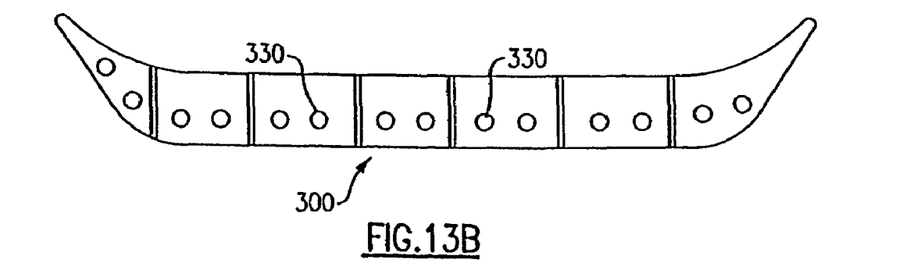

Turing to FIGS. 10 and 13A, 13B, the hold 305 of the vessel is the volume enclosed by the pontoons and bridge. Inside the hold are a number of spaced-apart fiberglass trusses and fiberglass bulkheads. The trusses 300 run along the length of the vessel and are transverse to the bulkheads 320. The trusses may be of different heights. For example, the trusses in the pontoons are higher than the trusses in the bridge.

The bulkheads and trusses have openings 330 that allow filling the hold with polystyrene or other buoyant material in order to add ballast to the hold and added buoyancy. By way of example, the pontoons and bridge may be of molded plastic or fiberglass formed in two parts e.g., upper and lower portions. The bulkheads and trusses may be formed in place within one of the portions, or the bulkheads and trusses may be separately molded and then fixed in place before the portions are assembled.

A feature of the vessel is that, with opposing end portions of the bulkheads integrally formed with the hold, the vessel has a substantial deck surface that covers most of the rectangular footprint of the vessel. In conventional house boats the deck surface of a pontoon house boat is built over the pontoons. According to the invention, the pontoons and the bridge are buoyant, stable, and have sufficient integrity to support the main cabin area. Moreover, with the bulkheads selectively positioned below exterior walls, or adjacent cabin features such as an interior wall or a storage unit, the deck height is lower than a deck on a conventional pontoon boat. Thus, while portions of the pontoons may exceed a diameter of two feet, the cabin deck is situated at an elevation approximately twelve inches below the tops of the pontoons. By placing the interior deck between the pontoons and below the tops of the pontoons, the vessel has a lower center of gravity and thus is more stable.

The exemplary vessel 10 is about eighteen feet long and the main cabin area is about six feet wide. The vessel is narrow enough that it may be carried on a conventional trailer without the need for special towing permission of highway authorities. The height of the cabin at the top of the main canopy is about six feet.

While exemplary embodiments of the invention have been illustrated, numerous variations will be apparent without departing from the concepts presented herein. For example, the locations of the various utility stations including the storage lockers, galley, lavatory, toilet, shower and water heater may be interchanged with one another. The vessel may also be equipped with solar energy panels that convert solar energy into electric energy. The converted electric energy may be used to run the vessel or charge the battery bank. Such solar panels may be incorporated into the main or auxiliary canopies. In another alteration, vessel may be equipped with a fuel cell and suitable storage tanks for fuel cell gasses. In that way one could dispense with the battery bank. All of the foregoing and other unforeseeable modifications are deemed within the spirit and scope of the invention. Accordingly the scope of the invention is only limited by the claims.

I claim:

1. A trailerable recreational vessel comprising:
    a hull comprising a pair of spaced-apart pontoons and a bridge connecting the pontoons together and forming a deck for passengers, said deck extending from a bow of the vessel, along a main cabin and to the stern of the vessel;
    at least one rigid bulkhead disposed between the bow and the stern of the vessel and extending from the deck;
    a collapsible main canopy normally stored in the bow of the vessel and operable to extend from the bow to the at least one bulkhead to cover the deck from the bow to the bulkhead.

2. The vessel of claim 1 comprising a second bulkhead spaced from the first bulkhead for defining a rear compartment.

3. The vessel of claim 2 wherein the rear compartment comprises a toilet.

4. The vessel of claim 2 wherein the rear compartment comprises a shower area.

5. The vessel of claim 2 wherein the rear compartment comprises a water heater.

6. The vessel of claim 1 wherein the stern comprises a deck portion for holding tanks comprising one or more of the group consisting of water, pressurized air and propane.

7. The vessel of claim 1 having two removable bulkheads extending from port to starboard and spaced apart to define a compartment on the deck.

8. The vessel of claim 7 wherein the bulkheads extend vertically from the deck and terminate in a curved edge extending from port to starboard.

9. The vessel of claim 7 wherein each bulkhead has an opening in its center.

10. The vessel of claim 9 wherein each bulkhead has a door that is removable.

11. The vessel of claim 8 wherein the vessel has a curved edge and the curved edge of the bulkhead corresponds to the curved edge of the bow for storing the bulkheads against the bow.

12. The vessel of claim 7 further comprising an auxiliary canopy that selectively covers the space between the bulkheads, said auxiliary canopy comprising a material that resists one or more of the group consisting of water and wind.

13. The vessel of claim 1 wherein a portion of the deck between the bow and the rear compartment comprises a main cabin with a galley and a lavatory.

14. The vessel of claim 1 wherein the bow comprises a pilot seating area.

15. The vessel of claim 1 wherein the main canopy comprises a material that resists one or more of group consisting of water and wind.

16. The vessel of claim 15 wherein the main canopy comprises a plurality of ribs having opposite vertical portions connected together by a lateral curved portion, wherein the curved portion of the ribs corresponds to the curve of the bow.

17. The vessel of claim 16 wherein the ribs and material in a collapsed state rest in the bow and in a raised state extend from the bow to the at least one stern bulkhead.

18. The vessel of claim 17 wherein raised canopy has a semicircular upper portion and vertical side portions.

19. The vessel of claim 1 further comprising a pair of electric motors, a rudder operatively associated with each electric motor and a controller for controlling the speed of the motors and the orientation of the rudders to drive and steer the vessel.

20. The vessel of claim 19 wherein each pontoon has one of the motors.

21. The vessel of claim 20 wherein the starboard side motor is connected to a left hand screw propeller and the port side motor is connected to a right hand screw propeller.

22. The vessel of claim 1 wherein the rigid bulkhead comprises a material selected from the group consisting of engineering plastic, resin, wood, steel and aluminum or combinations thereof.

23. The vessel of claim 1 wherein the deck is disposed at or above a plane extending laterally across the middle of the pontoons.

24. A trailerable recreational vessel comprising:
  a hull comprising a pair of spaced-apart pontoons and a bridge connecting the pontoons together and forming a deck for passengers, said deck extending from a bow of the vessel, along a main cabin and to a stern of the vessel;
  a plurality of trusses having first and second opposing end portions, the first end portions formed in one of the pontoons and the second end portions formed in the other pontoon;
  at least one bulkhead disposed between the bow and at the stern of the vessel;
  a collapsible main canopy normally stored in the bow of the vessel and operable to extend from the bow to the at least one bulkhead to cover the deck from the bow to the bulkhead.

* * * * *